(12) United States Patent
Weidner et al.

(10) Patent No.: US 6,274,229 B1
(45) Date of Patent: Aug. 14, 2001

(54) GREASE ABSORBING PAD WITH ANTI-STICK COATING

(76) Inventors: Ron J. Weidner, 7016 Johnsburg, Spring Grove, IL (US) 60081; John C. Miller, 464 Braddock Dr., Fresno, CA (US) 93720

( * ) Notice: Subject to any disclaimer, the term of this patent is extended or adjusted under 35 U.S.C. 154(b) by 0 days.

(21) Appl. No.: 09/483,978

(22) Filed: Jan. 18, 2000

(51) Int. Cl.[7] .................................................. B32B 23/08
(52) U.S. Cl. ..................... 428/213; 219/725; 219/733; 428/311.11; 428/511; 428/537.5
(58) Field of Search .............................. 428/213, 311.11, 428/311.91, 537.5, 511.76, 168, 77, 182, 184, 186, 185, 183, 192, 167, 169, 903, 913, 121, 68; 219/725, 733, 732; 383/104, 109, 113; 426/107, 113, 243, 106, 124, 129; 442/259, 389; 99/400, 425, 444–446, 422–424, 495

(56) References Cited

U.S. PATENT DOCUMENTS

| | | | |
|---|---|---|---|
| 4,930,906 | * | 6/1990 | Hemphill ................................ 383/89 |
| 4,950,524 | * | 8/1990 | Hacker ................................... 428/163 |
| 5,093,176 | * | 3/1992 | Pribonic et al. ........................ 428/76 |
| 5,814,396 | | 9/1998 | Weidner et al. . |

* cited by examiner

*Primary Examiner*—Timothy F. Simone
(74) *Attorney, Agent, or Firm*—John G. Premo

(57) ABSTRACT

Improved disposable three layered pads for collecting cooking grease produced during the cooking of fatty foods particularly in the cooking area of a microwave oven as described in U.S. Pat. No. 5,814,396. These pads comprise (a) a top grease absorbing layer having at least one ply of a grease absorptive sheet; (b) a middle grease and high temperature resistant layer; and (c) a bottom layer composed of an anti-stick heat insulating sheet. The pad is dimensioned to cover a substantial portion of the bottom cooking area of a microwave oven when used in these devices. The top layer is from 2 to 50 times thicker than the middle and bottom layer. The improvement comprises a small yet effective amount of anti-stick coating on the top layer of these three layered pads. These anti-stick coatings may be selected from such substances as vegetable oils, animal fats and synthetic lubricants.

7 Claims, 1 Drawing Sheet

GREASE ABSORBING PAD WITH ANTI-STICK COATING

BACKGROUND OF THE INVENTION

1. Field of the Invention

This invention relates to disposable pads for absorbing cooking grease.

2. Description of the Prior Art

U.S. Pat. No. 5,814,396, the disclosure of which is incorporated herein by reference, describes an improved grease absorptive pad as being a disposable three layered absorptive pad for collecting and draining cooking grease. It is most effective in collecting grease produced during microwave oven cooking. The pad also may be used to drain grease from recently prepared fatty foods.

The top layer is made up of at least one ply of a grease absorptive sheet. The middle layer is a grease resistant sheet. Finally, the bottom layer is an anti-stick insulating sheet. The pad is dimensioned to cover a substantial portion of the bottom cooking area of a microwave oven. It may be of any convenient size when it is used to drain freshly cooked fatty foods.

The top layer of the disposable three layered pad is most often thicker than the middle and bottom layers. Also the top layer beneficially contains a plurality of plies which are readily assembled from cellulose fibers such as an absorptive paper. The middle layer desirably is formed from a high temperature stable, grease resistant plastic sheet such as high density polyethylene. The expression 'high temperature' means the temperature at which fatty foods are usually cooked. The bottom layer is a heat insulating sheet. Cellulose fibers of the type used to form the top layer may be used to form the bottom layer.

It has been found that in certain instances some foods tend to stick to these absorptive pads. While the portions of the pads stuck to the food was easily removed it would be an improvement if this occasional sticking could be eliminated. It is therefore an object of the invention to provide a grease absorptive pad that does not stick to food within which it is in contact. It is also an object of the invention to provide a grease pad of the type described which has on its surface a coating which contains an effective amount of an anti-stick agent.

SUMMARY OF THE INVENTION

The invention relates to improved disposable three layered pads for collecting cooking grease produced during the cooking of fatty foods particularly in the cooking area of a microwave oven as described in U.S. Pat. No. 5,814,396. These pads comprise (a) a top grease absorbing layer having at least one ply of a grease absorptive sheet; (b) a middle grease and high temperature resistant layer preferably constructed of plastic; and (c) a bottom layer composed of an anti-stick heat insulating sheet. The pad is dimensioned to cover a substantial portion of the bottom cooking area of a microwave oven when used in these devices. The top layer is from 2 to 50 times thicker than the middle and bottom layer. The improvement with which this invention is concerned comprises a small yet effective amount of anti-stick coating on the top layer of these three layered pads. These anti-stick coatings may be selected from materials in the following groupings: vegetable oils, animal fats and synthetic lubricants. Since the coatings will contact foods these coatings are further characterized as being described in EAFUS, which is an acronym for "Everything" Added to Food in the United States, a food additive data base published by the U.S. Food and Drug Administration.

The anti-stick coating preferably is a vegetable oil, desirably a blend of vegetable oils combined with a dimethylpolysiloxane polymer and/or lecithin. The coating also may be a synthetic polymer exemplified by silicone polymers, floroalkylene polymers and alkane polymers. Good results are obtained when the coatings are either a dimethypolysiloxane polymer or a polyethylene.

THE DRAWINGS

For a more detailed description of the invention reference may be had to the drawings of which:

In the drawings like parts have like numbers.

DETAILED DESCRIPTION OF THE INVENTION

Figure 1:
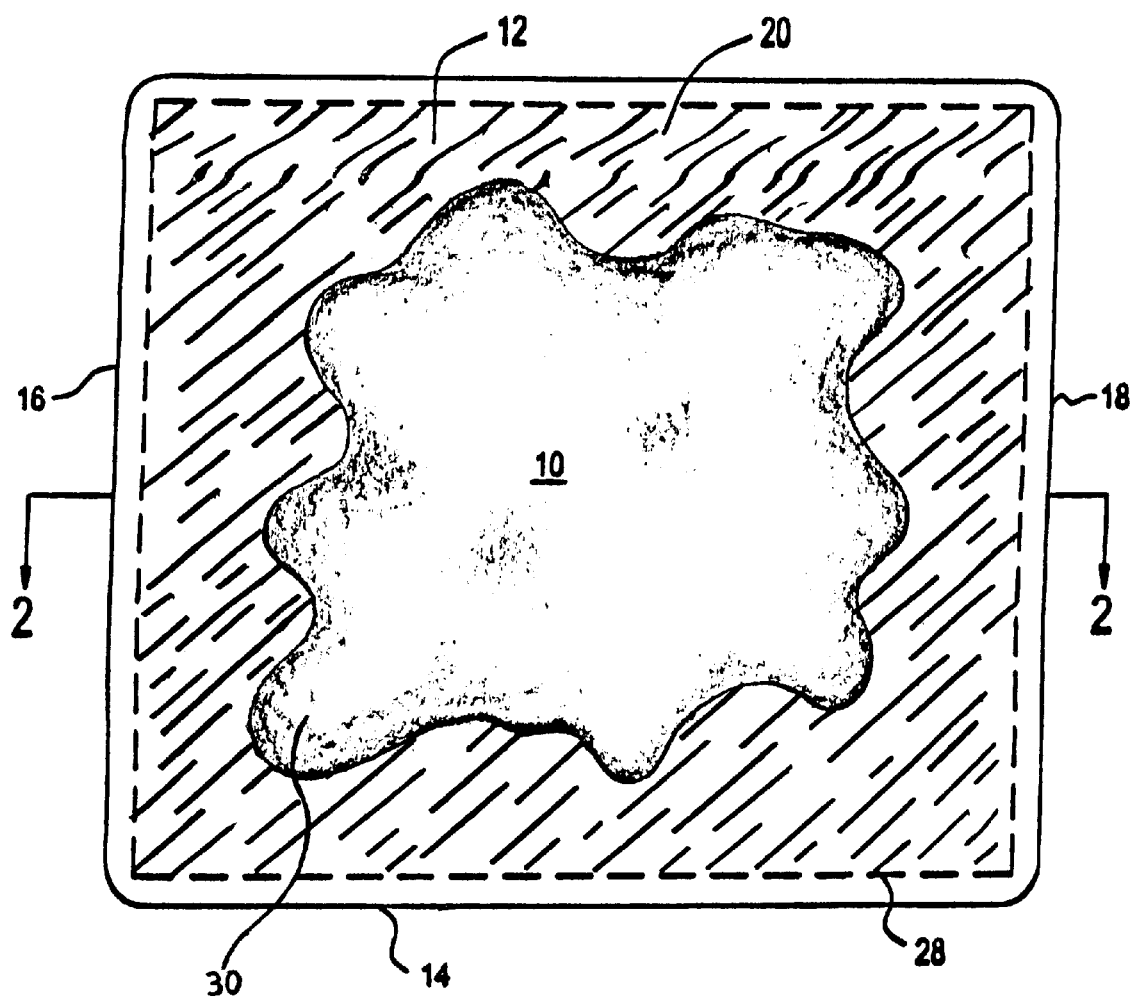
FIG. 1 is a top view of a coated disposable pad of the invention.

With specific reference to the drawings there is shown in FIG. 1 a disposable pad designated generally by the numeral 10. This particular embodiment is shown as a square substantially flat pad having a top 12 and a bottom 14. The sides of the square are designated by the numerals 16 for the left and 18 for the right.

Figure 2:
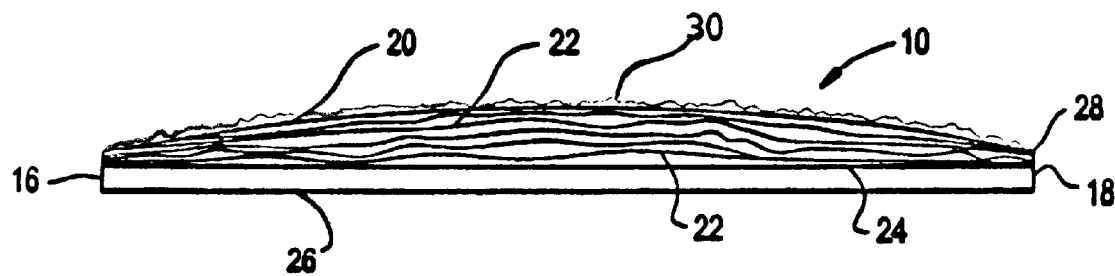
FIG. 2 is a horizontal side view taken along lines 2—2 of FIG. 1.

As illustrated in FIG. 2 the disposable pad is made up of a top layer 20 which is shown in FIG. 2 as being composed of several plies 22 of a grease absorptive material. The middle layer 24 is a thin, grease resistant sheet which is superimposed upon bottom layer 26 which acts to insulate middle layer from excessive heat which might cause it to stick to the bottom of a microwave oven. The three layers may be assembled into a unitary disposable grease retaining pad by means of stitching 28. Adhesives may be substituted for the stitching.

In a typical embodiment of the invention, the top 12 and bottom 14 of disposable pad 10 would be 9 inches in width and side 16 and 18 would be 11 inches in length. The dimensions of the disposable pad 10 will vary depending on the size of the bottom of the particular microwave oven in which they are used. In some cases these ovens have a circular rotating "lazy susan" type assembly located on the floor of the ovens and in such cases the disposable pad 10 would be circular in shape.

Top layer 20 may be a single ply of a grease absorbing material. It may be a porous paper assembly likened to a tea bag filled with a grease absorbent such as clays e.g. vermiculite or activated carbon. Preferably the top layer is made from absorptive paper products such as paper towel stock. Middle layer 24 is preferably a thin plastic sheet of about from 0.5 to several mills in thickness. It should be able to withstand the temperatures generated from microwave oven cooking without losing its integrity. Hydrocarbon plastic sheeting such as high density polymers of ethylene, propylene and butylene are preferred materials. Plastic sheeting containing chlorine, nitrogen or fluorine in their molecular make-up are not materials of choice due to the possibility of generating toxic compounds. Bottom layer 26 should be about the same thickness as middle layer 24 and should be constructed of a heat insulating material which shields the middle layer 24 from the hot bottom surface of microwave ovens. These hot surfaces may cause middle layer 24 to stick and possibly tear after the cooking process is finished.

As indicated top layer 20 is preferably thicker than individual layers 24 and 26. The ratio of this thickness differential is at least 2 to 5 times greater. Preferably the differential is 10 to 50 times greater.

The top layer is coated with an anti-stick coating designated by the numeral 30. When vegetable oils, such as canola oil is used as the coating material good results are achieved when the coating is about 0.074 grams per sq. inch of top surface. Depending on the material used to form the coating the thickness may vary from between about 0.0001 to 0.1 gram per sq. inch. The polymers, particularly the dimethylpolysiloxanes are effective in very low dosages. The coating materials may be in the form of liquids, oil in water emulsions or suspensions. They may be applied by spraying, roller coating or brushing. The most important discovery of this invention is that even though small amounts of the coatings are used they are effective in preventing the sticking of food to the pads. This is surprising when it is believed that one skilled in the art would expect the coatings to be absorbed by the pads after application and hence become incapable of acting as an anti-sticking coating.

EXAMPLE

A pad of the type described in U.S. Pat. No. 5,841,396 containing several plies of paper toweling was spray coated on its top surface to provide a coating of 0.074 grams per sq. inch. The coating was the commercial vegetable oil product, PAM, which is a blend of canola, sunflower oils and lecithin. A variety of foods that had shown a tendency to stick on the pad were placed on the pad and cooked in a microwave oven. No sticking was observed.

What is claimed is:

1. In a disposable three layered pad for collecting cooking grease produced during the cooking of fatty foods comprising:
   a) a bottom layer composed of an anti-stick, heat insulating sheet:
   b) a middle grease and high temperature resistant layer; and,
   c) a top grease absorbing layer which has at least one ply of a grease absorptive sheet and is from 2 to 50 times thicker than the middle and bottom layers:

the improvement which comprises a small yet effective amount of anti-stick coating on the top grease absorbing layer from the group consisting of vegetable oils, animal fats and synthetic lubricants which substances are described in the food additive data base published by the U.S. Food and Drug Administration entitled, Everything Added to Food in the United States.

2. The disposable three layered pad of claim 1 where the anti-stick coating is a vegetable oil.

3. The disposable three layered pad of claim 1 where the anti-stick coating is a blend of vegetable oils combined with a dimethylpolysiloxane polymer.

4. The disposable three layered pad of claim 1 where the anti-stick coating is a blend of vegetable oils combined with lecithin.

5. The disposable three layered pad of claim 1 where the anti-stick coating is a synthetic polymer from the group consisting of silicone polymers, floroalkylene polymers and alkene polymers.

6. The disposable three layered pad of claim 5 where the anti-stick coating is a dimethylpolysiloxane polymer.

7. The disposable three layered pad of claim 5 where the anti-stick coating is a polyethylene.

* * * * *